O. H. SKINNER.
PISTON.
APPLICATION FILED OCT. 4, 1920.
1,414,221.
Patented Apr. 25, 1922.
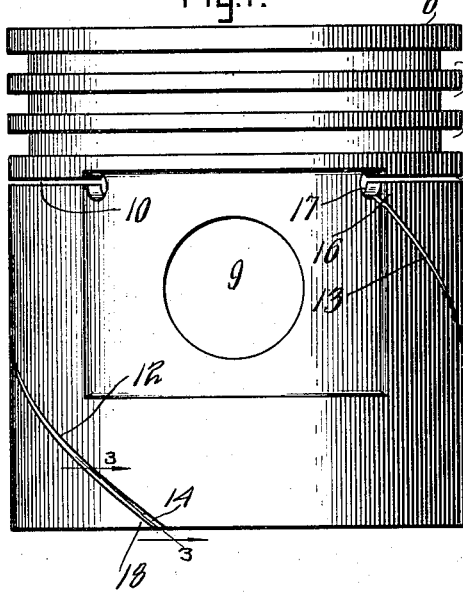
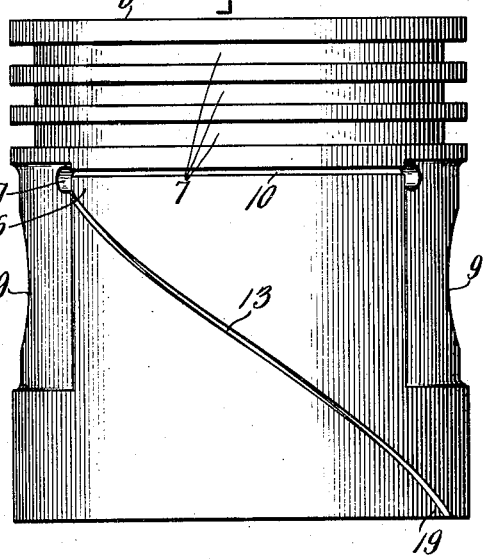
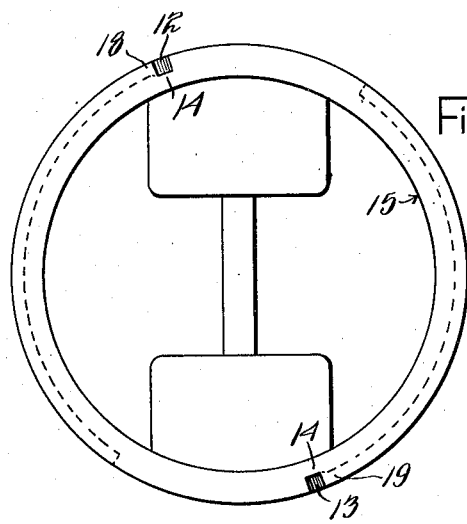
Inventor
Oramel H. Skinner,
By E. W. Bradford
Attorney

UNITED STATES PATENT OFFICE.

ORAMEL H. SKINNER, OF INDIANAPOLIS, INDIANA.

PISTON.

1,414,221. Specification of Letters Patent. Patented Apr. 25, 1922.

Application filed October 4, 1920. Serial No. 414,515.

*To all whom it may concern:*

Be it known that I, ORAMEL H. SKINNER, a citizen of the United States, residing at Indianapolis, in the county of Marion and State of Indiana, have invented certain new and useful Improvements in Pistons, of which the following is a specification.

My said invention relates to pistons for engines, and more particularly to the type of pistons used in internal combustion engines or motors and having a skirt or tubular portion, extending rearwardly from the piston head.

The object of my invention is to produce a piston which will be inexpensive, which will fit very snugly in its cylinder, without danger of scoring it, which will not rattle or chatter, and which will bear uniformly on the cylinder throughout its circumference, and when in use substantially throughout its length, said piston being designed particularly as an improvement on that disclosed in the patent to Spillman 1,325,176, Dec. 16, 1919.

Referring to the accompanying drawings which are made a part hereof and on which similar reference characters indicate similar parts, Figure 1 is an elevation of my piston, Figure 2 a similar elevation taken at a distance of 90° from Figure 1, Figure 3, a section on line 3—3 of Figure 1, and Figure 4 an end view.

In the drawings, 6 denotes the head of a piston of any preferred construction having grooves 7 for packing rings as is usual. The tubular portion or skirt 8 extends rearwardly from the head and has openings or bearings 9 for the piston pin as usual. This tubular portion has transverse or substantially horizontal slits 10 and 11 and also has spiral slits 12 and 13 cut therein as in the Spillman patent, but instead of cutting the slits 12 and 13 through the skirt throughout their length, thin webs 14 are left intact in the inturned rim 15 of the skirt.

The slits 12 and 13 are cut so as to have their lower ends under or nearby under holes 9, and their upper ends connected with one end of slots 10 and 11 respectively. They are also substantially spiral in direction, as shown, and practically divide the skirt from the head, thereby preventing the rapid transmission of heat from head to skirt and providing a piston the extreme edge of the skirt of which will always be comparatively cool and subject to less expansion than otherwise.

By cutting the slits in this manner I provide a piston skirt with two resilient tongues of approximately triangular form free at their points 16 and 17 to expand and contract under the influence of heat. The other two tongues 18 and 19, which are free in the Spillman device are held by the portions 14, 14 in my construction and so can expand only as a portion of the circumference of the piston. There are no free portions at the lower extremity of my skirt consequently chattering is reduced to a minimum and the advantages of a solid structure are secured. As the heating of the piston is naturally greatest at the head and diminishes toward the lower end of skirt, the piston may be practically non-expansible at its lower end and may approach in diameter very closely to the diameter of the cylinder without danger of binding in operation as the grooves will provide for the contraction and expansion, or elasticity, required by the variation in temperature during operation. I am enabled thus to attain the advantageous results described in the patent and also maintain the piston of a fixed form and all parts integral at the lower end.

The piston may be made of aluminum or an aluminum alloy for lightness, this type of piston being well adapted to such material.

My anti-chattering device may be modified in various ways, the scope of the invention being shown by the appended claims.

Having thus fully described my said invention, what I claim as new and desire to secure by Letters Patent, is:

1. A piston having a head and a skirt, said skirt having transverse slits and spiral slits extending from the transverse slits to the rear edge of the skirt, each side of the skirt thus forming oppositely extending tongues, the upper tongue being freely movable and the lower tongue being permanently fixed at its tip to the adjacent portion of the skirt, substantially as set forth.

2. An engine piston having a head and a skirt, the skirt having transverse slits adjacent to the head and spiral slits extending from said transverse slits to the rear edge of the skirt, said slits extending through the metal except at a point near the edge of the skirt.

3. A piston comprising a head, a skirt and an inwardly extending rim near the edge of the skirt, said skirt having transverse slits extending therethrough, spiral slits connected to the transverse slits through the skirt and to near its rear edge, the rim embodying connecting portions extending across the spiral slits.

In witness whereof, I have hereunto set my hand and seal at Indianapolis, Indiana, this 27th day of September, A. D. nineteen hundred and twenty.

ORAMEL H. SKINNER. [L. S.]

Witnesses:
J. J. SWAN,
CRYSTAL GILPIN.